UNITED STATES PATENT OFFICE.

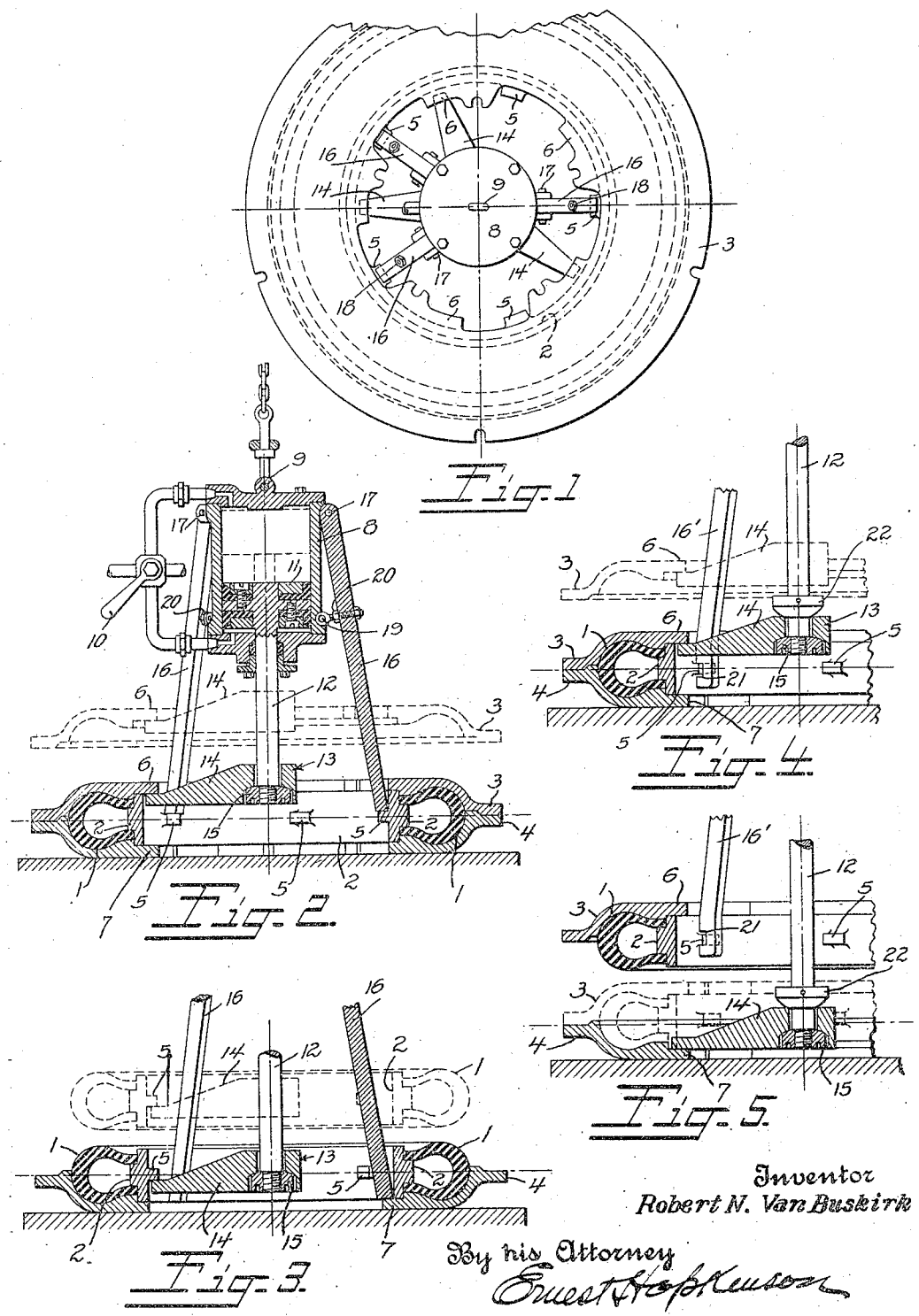

ROBERT N. VAN BUSKIRK, OF DETROIT, MICHIGAN, ASSIGNOR TO MORGAN & WRIGHT, A CORPORATION OF MICHIGAN.

DEVICE FOR REMOVING TIRES FROM MOLDS.

1,418,753. Specification of Letters Patent. Patented June 6, 1922.

Application filed January 11, 1922. Serial No. 528,379.

*To all whom it may concern:*

Be it known that I, ROBERT N. VAN BUSKIRK, a citizen of the United States, residing at Detroit, in the county of Wayne and State of Michigan, have invented a certain new and useful Device for Removing Tires from Molds, of which the following is a full, clear, and exact description.

This invention relates to apparatus for facilitating the manufacture of tires, and more particularly to a mold opener. This application is a continuation-in-part of my prior application Serial No. 458,992, filed April 6th, 1921.

The casings of pneumatic tires, after building, are cured in molds with their insides supported either on a metallic core or by internal fluid pressure. In the latter case, the margins or beads of the casing are mounted on a "bull" ring, and scaled thereon by the confining molds sections with or without a strip of rubber. After curing, the mold sections and core or bull ring are removed. In all cases, but especially when the tread is shaped with knobs, grooves and the like, difficulty is encountered in removing the mold sections from the cured casing. In large size "knobby" treads, for instance, it is not infrequently necessary to employ four or five men to wrest the sections apart. The present invention relates to a power-operable device for opening sectional tire molds with facility and less arduously.

Essentially the invention consists in providing members engageable with separate mold sections and shiftable to forcibly pull them apart.

The invention is illustrated in the accompanying drawings in which:

Fig. 1 is a plan view of the apparatus in working relation to a mold.

Fig. 2 is a vertical cross-section thereof, showing the upper mold section about to be removed.

Fig. 3 is a similar vertical section showing the tire and its supporting section being removed from the lower section of the mold.

Figs. 4 and 5 are views similar to Figs. 2 and 3 of a modified form of the invention.

In the drawings the tire 1 is illustrated as being mounted on a bull or sealing ring 2 and confined between the opposed complementary sections 3 and 4 of a well-known type of sectional mold. The bull ring 2 is provided at its inner periphery with a set of spaced lugs 5 and the outer sections 3 and 4 of the mold are likewise provided with sets of projections 6 and 7, respectively, which in use are arranged in pairs opposite or in registration with one another.

One form of the mold opening device, see Figs. 1 to 3, comprises a cylinder 8 provided in its head with an apertured ear 9 for suspension in any suitable manner, as by a cable depending from a travelling hoist (not shown) overhead on the ceiling of the press room above a table or conveyor, and in the latter case parallel its run. Through a valve 10 fluid under pressure, such as air or water, and preferably the latter, may be suitably supplied to the opposite ends of the cylinder to reciprocate a piston 11 having a depending piston rod 12. On the lower end of the piston rod and swiveled for angular movement relative thereto is a member indicated generally by the numeral 13 having a plurality of arms 14. The plural-armed member 13 is preferably made in one piece and demountably secured to rod 12 by a nut 15 so that it may be supplanted by other members 13, each having arms of the proper length to engage a set of projections on the inner periphery of other molds of different size.

For engaging a set of projections on another section of the mold at the same time a plurality of struts 16 are provided, and preferably, as shown, these are hinged at 17 to the upper end of the cylinder 8. Preferably, but not necessarily, bolts 18, hinged to the cylinder at 19, are passed loosely through the struts 16 which by the nuts 20 they adjustably confine. In this way, the struts may be shifted to engage a set of the projections on the inner periphery of various sized molds.

In operation, the suspended device is lowered so as to first seat the feet of the struts 16 on the set of lugs 5 of the bull ring and then the arms 14 are positioned so that on downward movement of the piston 11, they will clear the projections 6 on the upper section of the mold. When the arms 14 have been lowered below the lugs 6 on the upper mold section, movement of the piston 11 is halted and the arms 14 swung underneath the projections 6. Then the piston 11 is reversely operated to forcibly separate the upper mold section from the tire, as illustrated in dotted lines in Fig. 2. In any suitable manner, the upper mold section may be removed or cleared from the device. Then the bull ring carrying the tire may be removed from the lower mold section by repeating the steps above mentioned.

In Figs. 4 and 5 of the drawings, I have illustrated a modification of the invention in which the struts 16' are provided with notches 21. The member 13 with its arms 14 is preferably, but not necessarily, swiveled, as previously described, to the piston-rod 12, but is confined against substantial movement lengthwise the piston-rod between the nut 15 and a collar 22 suitably secured to the rod 12, as by pinning, shouldering, or shrinking, thereto. With this modified form of construction, after engaging the notches 21 of the struts 16' in the projections 6 on the intermediate mold section, the upper and lower mold sections may be separated without further manipulation or adjustment by admitting fluid first to one side and then to the other side of the piston. Figs. 4 and 5 show clearly how this is done.

The device, in either form, is especially advantageous for use with a conveyor on which the molds may be supported and opened while moving but the manner of supporting the molds is obviously immaterial, a table, for instance, may be employed.

The invention is not limited to the precise details of construction shown and described. The plural-armed member 13 may be fixed instead of swiveled to the piston-rod 12, their turning being effected by turning the piston-rod in its bushed journal. Three sets of members 13 might be employed to simultaneously separate the sections and free both sides of the tire casing. Preferably, the eye 9 on the cylinder head is connected to a supporting cable or chain by a swivel for facilitating rotation of the cylinder 8 about its axis. Obviously, the device may be used for removing the outer sections of the mold from the tire whether the latter be mounted on a bull ring, as shown, or on a core. For an understanding of the scope of the invention reference should therefore be made to the accompanying claims in which the term "sections" or "mold sections" is intended to comprehend either a bull ring or a core as functionally the latter also participate in the shaping of portions of a tire's surface.

Having thus described my invention, what I claim and desire to protect by Letters Patent is:

1. In a device for opening annular molds whose sections have projections on their peripheries, in combination, a fluid pressure device comprising a cylinder and piston operable therein, and sets of members connected respectively to said cylinder and piston for engaging the projections on separate mold sections.

2. In a device for opening annular molds whose sections have projections on their peripheries, in combination, at least two sets of members for engaging projections on separate sections of the mold, a cylinder to which one set of members are articulated, a piston operable therein and operatively connected to another set of members whereby upon the admission of fluid under pressure to the cylinder one set of members may be moved relative to the other in the direction of the axis of the mold.

3. In a device for opening annular molds whose sections have projections on their peripheries, in combination, two sets of members for engaging a plurality of projections on separate sections of a mold, a cylinder, and a piston operable therein, said sets of projections being operatively connected to said piston and cylinder respectively, at least one of said sets of members being adapted to support the cylinder in substantially co-axial relation with the mold.

4. In a device for opening annular molds whose sections have projections on their inner peripheries, in combination, members for engaging projections on separate sections of the molds, a cylinder adapted to be supplied with fluid under pressure, a piston operable in said cylinder, a piston rod, a member having arms adapted to be engaged with projections on the molds, said member being mounted on the piston rod and rotatable about the axis of the cylinder, and struts secured to the cylinder and adapted to be engaged with projections on another mold section to co-operate with said arms in opening a mold.

5. In a device for opening annular molds whose sections have projections on their inner peripheries, in combination, a cylinder and piston operable therein by fluid under pressure, struts secured to the cylinder and extending in the general direction of its axis and adapted to support the cylinder, a member having a plurality of arms for engaging the projections on a mold section, and a swiveled connection between said piston and member for facilitating location of its arms in or out of engagement with the projections on the mold.

6. In a device for opening annular molds whose sections each have projections on their inner peripheries, in combination, a cylinder adapted to be supplied with fluid under pressure, members hinged at one end to said cylinder and adjustable about their hinges to permit engaging their outer ends with a series of projections on one section of the mold, a piston operable in said cylinder, and a member having a plurality of arms operatively connected with the piston and movable thereby relative to the first mentioned members in the direction of the axis of the mold for separating its sections.

7. In a device for opening annular molds whose sections have sets of projections on their inner peripheries, in combination, members adapted to engage a set of projections on one mold section, a member having a plurality of arms adapted to be engaged with a set of projections on an adjacent mold section, said last named member being rotatable in the plane of its extent, and means for moving the last named member axially of the first named members to separate the mold sections.

8. A device for opening three-part annular molds whose outer and intermediate sections are provided with projections on their inner peripheries having in combination, a member for engaging a projection on the intermediate section, means for engaging projections on the outer sections, a cylinder to which the member is connected, and a piston operable within the cylinder and connected to said means whereby upon the admission of fluid under pressure to the cylinder the sections of a mold may be separated.

Signed at Detroit, county of Wayne, State of Michigan, this 5th day of January, 1922.

ROBERT N. VAN BUSKIRK.